Patented Dec. 29, 1936

2,065,852

UNITED STATES PATENT OFFICE 2,065,852

GLASS RESISTANT TO ALKALI METAL VAPORS AND METHOD OF MAKING IT

Robert H. Dalton and Harrison P. Hood, Corning, N. Y., assignors to Corning Glass Works, Corning, N. Y., a corporation of New York No Drawing. Application November 6, 1934, Serial No. 751,793

11 Claims. (Cl. 91—70)

This invention relates to glasses which are resistant to discoloration by hot alkali metal vapors and has for its object to impart resistance to normally non-resistant glasses.

Ordinary glasses are subject to a rapid discoloration of their surface when heated to 250° C. to 350° C., or higher, in contact with alkali metal vapors, as for example, in the sodium vapor arc lamp. Such discoloration greatly decreases the luminosity of the lamp and has been the chief obstacle to the successful development of this efficient light source. It has generally been considered that this discoloration is in some manner dependent upon a high silica content in the glass whereby the sodium causes reduction of some of the silica to metallic silicon. Various glasses of abnormally low silica content have been proposed as envelopes for such lamps to overcome the difficulty. These special glasses possess undesirable characteristics, particularly with respect to chemical stability and softness, which not only makes difficult the fabrication of tubes, bulbs and the like therefrom, by ordinary glass working methods, but also renders such articles easily susceptible to atmospheric attack. It has further been proposed to cover and protect these special glasses against atmospheric attack by flashing them on the inside of ordinary stable glasses, but their working properties are so different from normal glasses that the results have been unsatisfactory.

We have discovered that ordinary stable glasses which are normally discolored by contact with hot alkali metal vapors may be rendered resistant to such discoloration by coating them with a fired-on film comprising a mixture of alkali oxide and boric oxide, preferably in the proportion of 5–10 parts of alkali oxide and 90–95 parts of boric oxide. We have further found that such films are substantially transparent and when applied in a thickness of the order of magnitude of .01 mm., or less, do not craze or peel when the glass is subjected to thermal change.

Protecting films made in accordance with our invention may be prepared by treating the surface of the glass, which is to be exposed to the action of alkali metal vapors, with substances which on being heated will be converted into a mixture of alkali oxide and boric oxide, preferably in the above named proportions, and heating the glass to decompose the substance and fuse the resulting layer of oxides to the glass.

In preparing such films, we preferably proceed as follows: The glass surface is wet by means of a finely atomized spray or mist of a solution having a sodium oxide content of approximately 5–10% and a boric oxide content of approximately 90–95%, and composed of substances which on heating will be converted to sodium oxide and boric oxide, such as, for example, sodium hydroxide, sodium nitrate, or sodium carbonate, etc., or mixtures thereof, together with ammonium borate, boric acid, etc. At the same time the glass is heated to a temperature just high enough to cause the mist to dry rapidly on the glass, leaving the deposited salts in a uniform layer. The glass surface may also be wet by merely rinsing it with the solution and the film of solution remaining thereon is then dried uniformly by means of a jet of dry hot air.

The following solutions have been used successfully:

|  | "A" | "B" |
|---|---|---|
| $H_3BO_3$ | 20. gm. | 24. gm. |
| NaOH | 0.6 gm. | |
| $Na_2CO_3$ | | 2.6 gm. |
| $NH_4OH$ (conc.) | 2. cc. | 10. cc. |
| Dilute with water to | 90. cc. | 60. cc. |

The glass with its dry coating is then heated, preferably in an electric muffle, at about 600° C., or as hot as possible without deforming the glass for about two hours, or a time sufficient to decompose the salts and fuse the alkali-boric oxide mixture into the glass surface. The thickness of the coating may be increased by increasing the concentration of the solution of salts and/or by prolonging the exposure of the warm glass to the mist thereof, but the protective effect against discoloration is not much improved by increasing the thickness of the film beyond about .01 mm. and, if the thickness exceeds this, it crazes and peels off, due to expansion differences.

Glasses which have been coated in accordance with our invention are substantially transparent, that is, their original appearance is practically unchanged and they will remain substantially colorless when heated for 24 hours at 350° C. in contact with the vapor of metallic sodium. As condensed moisture gradually attacks the coating it is desirable, in fabricating a lamp from a bulb so coated on its interior, to direct the flame of the burner away from the interior of the bulb and to keep all parts of the bulb as warm as possible to avoid condensation.

It is not known definitely whether the alkali remains on the glass as the oxide or the hydrate or is combined with some of the boric oxide.

Under the conditions under which the films are prepared, it is possible that the alkali oxide may to some extent at least be combined chemically with the boric oxide and that the mixture may in some measure be hydrated. Therefore, by the terms "alkali oxide and boric oxide", or "sodium oxide and boric oxide", as used in the claims, we mean to include such compounds and hydrated mixtures. From knowledge gained through our researches and past experience in this art, we are convinced that the oxides of the other alkali elements—lithium, potassium, rubidium, and cesium—have the same protective effect when mixed with boric oxide in lieu of the sodium oxide of the above described mixtures.

While in the foregoing there has been shown and described the preferred embodiment of our invention, it is to be understood that minor changes in the details of construction, combination and arrangement of parts may be resorted to without departing from the spirit and scope of the invention as claimed.

Having thus described our invention, what we claim is:

1. The method of treating glass to make it resistant to discoloration of hot alkali metal vapors, which includes wetting the surface of the glass with a solution of salts consisting of alkali salts and boron compound, which on being heated will leave a residue consisting of alkali oxide and boric oxide, and heating the glass to decompose the salts and fuse the alkali oxide and boric oxide to the glass in a homogeneous layer.

2. The method of treating glass to make it resistant to discoloration of hot alkali metal vapors, which includes wetting the surface of the glass with a solution of salts consisting of a sodium salt and a boron compound which, on being heated, will leave a residue consisting of 5 to 10 parts of sodium oxide and 95 to 90 parts of boric oxide, and heating the glass to decompose the salts and fuse the residue to the glass in a homogeneous layer.

3. The method of treating glass to make it resistant to discoloration of hot alkali metal vapors, which includes wetting the surface of the glass with a solution of salts consisting of a sodium salt and a boron compound which, on being heated, will leave a residue consisting of 5 to 10 parts of sodium oxide and 95 to 90 parts of boric oxide, and heating the glass to decompose the salts and fuse the residue to the glass in a homogeneous layer not thicker than .01 mm.

4. The method of treating glass to make it resistant to discoloration of hot alkali metal vapors, which includes wetting the surface of the glass with a solution of sodium hydroxide and ammonium borate, drying the wet film uniformly and heating the glass.

5. The method of treating glass to make it resistant to discoloration of hot alkali metal vapors, which includes wetting the surface of the glass with a solution of sodium hydroxide and ammonium borate, drying the wet film uniformly, and heating the glass to decompose the sodium hydroxide and ammonium borate and form a fused-in coating comprising approximately 5% to 10% of sodium oxide and 95% to 90% of boric oxide.

6. The method of treating glass to make it resistant to discoloration of hot alkali metal vapors, which includes wetting the surface of the glass with a solution of sodium hydroxide and ammonium borate, drying the wet film uniformly, and heating the glass to decompose the sodium hydroxide and ammonium borate and form a fused-in coating comprising approximately 5% to 10% of sodium oxide and 95% to 90% of boric oxide not thicker than .01 mm.

7. A glass which is resistant to discoloration by hot alkali metal vapors, which has on its surface a fused-in layer consisting of alkali oxide and boric oxide.

8. A glass which is resistant to discoloration by hot alkali metal vapors, which has on its surface a fused-in layer consisting of alkali oxide and boric oxide not thicker than .01 mm.

9. A glass which is resistant to discoloration by hot alkali metal vapors, which has on its surface a fused-in layer consisting of sodium oxide and boric oxide.

10. A glass which is resistant to discoloration by hot alkali metal vapors, which has on its surface a fused-in layer consisting of 5% to 10% of sodium oxide and 95% to 90% of boric oxide.

11. A glass which is resistant to discoloration by hot alkali metal vapors, which has on its surface a fused-in layer consisting of 5% to 10% of sodium oxide and 95% to 90% of boric oxide not thicker than .01 mm.

ROBERT H. DALTON.
HARRISON P. HOOD.